Feb. 29, 1944.  M. RÖVER  2,342,696
LIQUID LEVEL GAUGE
Filed May 21, 1940
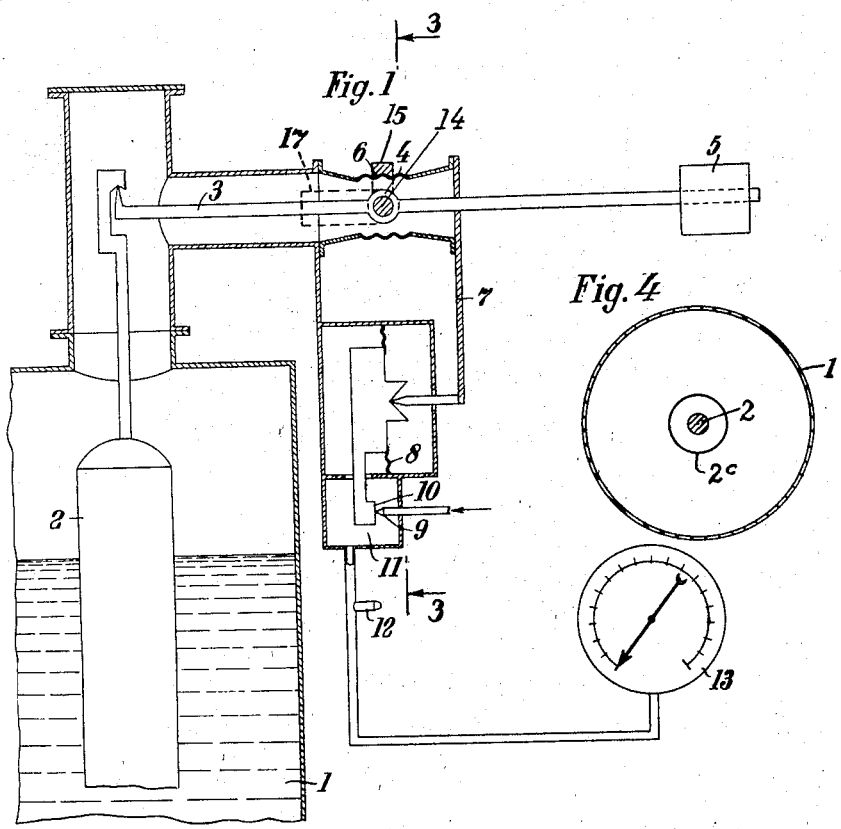
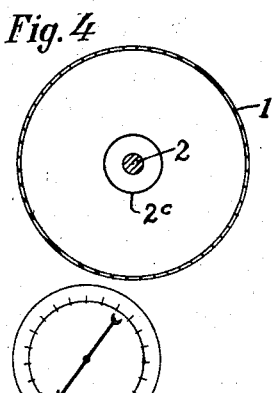
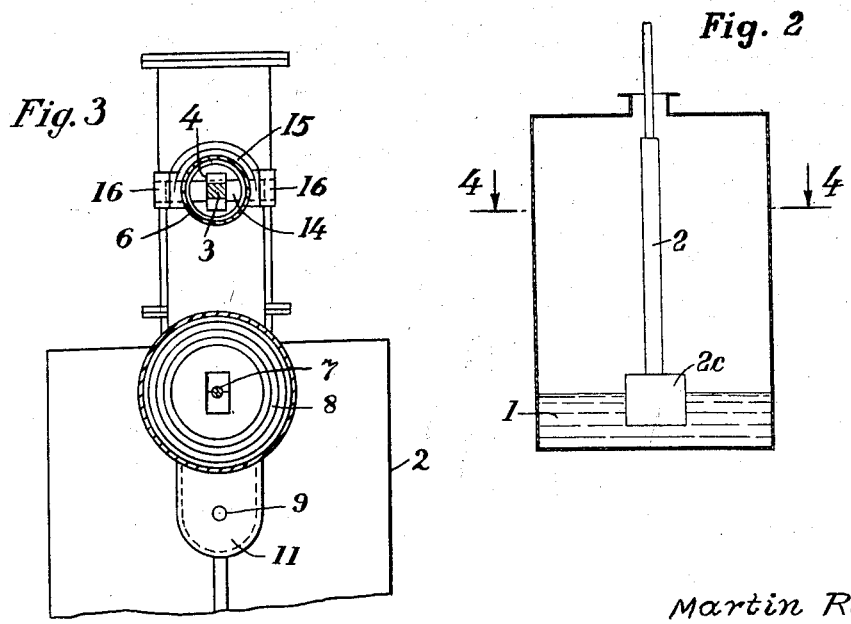
Martin Röver
INVENTOR.
BY
HIS ATTORNEYS Patented Feb. 29, 1944

2,342,696

UNITED STATES PATENT OFFICE 2,342,696

LIQUID LEVEL GAUGE

Martin Röver, Jessnitz/Anhalt, Germany; vested in the Alien Property Custodian

Application May 21, 1940, Serial No. 336,361
In Germany May 30, 1939

2 Claims. (Cl. 73—309)

This invention relates to a remote indicating apparatus for measuring the depth of liquids in tanks.

The measuring apparatuses for liquids hitherto known show one or several of the following defects: Incorrect registration or complete failure, if slight leaks occur in the conduit pipes, furthermore dependence of the registration on the temperature of the conduit pipe, sensitivity against rough treatment, low efficiency, which causes low adjusting power of the indicating or recording apparatus. If electricity is used as an auxiliary power, delicate, fine, mechanical parts have to be employed and special protective measures have to be taken when working with explosive substances. Mercury, furthermore, is used as contact liquid for many electrically operated remote indicating apparatuses which, however, in many cases is objectionable from a purely chemical view point.

It is an object of this invention to construct an indicating apparatus for measuring the depth of liquids in tanks etc.

Another object is the construction of an apparatus which is adaptable without danger to highly inflammable liquids.

These and other objects will be apparent from the following description.

A remote indicating apparatus for measuring liquids not showing any of the above mentioned disadvantages will be described hereinafter. It is designed to measure the depth of liquids in tanks, which are intended for work or storage, the depth of which liquid is difficult to determine by other measuring apparatuses, especially when the tanks are submerged or kept under high pressure. By the present invention it is also possible to construct an apparatus which is adaptable without danger to inflammable liquids, because it avoids electric current and the like.

The apparatus works according to the compensation principle by using compressed air, which does not come into contact with the liquid with which it may form an explosive gas-mixture.

The apparatus uses the known principle of measuring the buoyancy of a body submerged in the liquid, this buoyant body may be partly submerged for instance when measuring the depth of liquids, or completely submerged when measuring their density. The buoyant body may be adjusted to the form of the tank, in order to obtain an even graduation of the indicating apparatus. According to the present invention this buoyancy is measured by means of that pressure of the compressed air, automatically regulating itself, which is necessary to hold the buoyant body always at the same height. As the measuring apparatus performs small movements only around the zero-position, it is possible to transmit these movements outside the tank through an elastic membrane-packing free from friction. This membrane can be made, contrary to membranes for a deflection method, of flabby, non-stiff material.

To use such a membrane makes it possible to rigidly connect those parts of the transmitting system which are arranged outside the tank with those parts which are arranged inside the tank.

In the accompanying drawing which illustrates this invention Fig. 1 is an elevation, partly in section, of the liquid level gage embodied in this invention; Fig. 2 is an elevation, partly in section, showing a modified form of float; Fig. 3 is a side sectional view of Fig. 1 taken on the line 3—3; and Fig. 4 is a plan sectional view of Fig. 2 taken on the line 4—4.

In the drawing 1 designates the tank for the liquids and 2 the buoyant body. This buoyant body is mounted in the tank in such a way, that it begins shortly above the bottom of the tank and reaches up to the highest possible point of the liquid. This buoyant body 2 hangs on one arm of a double-armed lever 3 the other arm of which extends outside the tank through the gas tight bellows membrane 6. A fork 15, rigidly connected to the lever 3, grips around the membrane 6 and has, on each side a spindle bearing 16 which is rotatively mounted in a bearing 17 rigidly connected with the tank. The said spindle bearings 16 support rotative axle 14 which penetrates through the middle of the membrane 6 supporting lever 3 through bearing 4. The force of the tank-pressure effective on the membrane in a horizontal direction is also taken up by this arrangement.

The lever 3 carries on its right end a movable counter balance 5, to compensate the weight of the buoyant body when the tank is empty.

If the buoyant body 2 is raised in the tank by the rising liquid, the counter balance 5 sinks down, which by means of flange 7 rigidly connected to lever 3 presses against an annular membrane 8 installed in a pressure box 11, which on the other hand by means of the adjoined piece 10 releases the opening of the nozzle 9 for compressed air. By this nozzle 9 so much compressed air enters into the chamber 11, that membrane 8 and with it the lever 7 and the double-armed lever 3 are brought back into the original position, by lowering of the buoyant body 2. The pressure of the compressed air behind the membrane, which is admitted into the chamber 11 to compensate for the raising of the buoyant body 2, is therefore a measurement for the depth of the liquid in the tank 1. The air (or gas) pressure existing there is measured by any suitable apparatus, for instance: as illustrated in the drawing with an ordinary manometer 13. If the contents of the tank decrease, the pressure of the compressed air in the chamber 11 must be adjustable. A blow-off-nozzle 12 is therefore provided, which preferably is built in an adjustable manner. By adjusting this nozzle, leakages in the pipes may be compensated and are in this way not dangerous any more.

As the membrane always automatically maintains the right pressure within the remote measuring apparatus, changes of temperature are without influence on the resulting measurement. Likewise a change of the length of the conduit pipes is always possible. Also further indicating, registering or regulating devices may be used without further readjustment.

Membrane 6 forms an important part in making the outside parts of the apparatus air tight against the inside parts of the tank, since the apparatus works according to a compensation method, thereby registering small movements around the zero-position. This membrane can be constructed so strongly that the apparatus may be used without difficulties for tanks of considerable pressure (at the present about 25 atmospheres) and still possess high accuracy and excellent adjusting power.

Another important part, moreover, is the buoyant body 2. The weight of this body is somewhat greater than that of the quantity of water displaced by it but is preferably not so large as to cause unnecessary loading of the double lever 3. The body may consist of massive material, in most cases, however, a hollow piece of sufficient wall thickness is sufficient, which, when measuring chemically aggressive liquids, may be provided, if necessary, with a protective coating.

A special form of buoyant body 2 may be employed in the liquid level gauge embodied in the present invention. Such a special form of body, which may be cylindrical, is illustrated in Fig. 2 and may be chosen in such a way, that it is especially sensitive for a certain measuring range. This finds a most useful application for reaction vessels in chemical factories. Also the overflowing of storage tanks may be indicated in a striking manner and in time, by an increased scale movement being caused by a special form of the buoyant body.

Figure 2 shows diagrammatically a cross sectional view of a buoyant body. This simple form of the buoyant body is employed in a reaction vessel, wherein an exact measurement of the chemicals to be added is made possible by the enlargement 2c.

The new apparatus is of wide use. It may be employed for instance to measure specific weights of liquids, if the buoyant body is completely submerged. Furthermore it may serve as a regulator for regulating the depth, the contents or the density of the liquids. In connection with a regulating device controlled by compressed air, it may be used directly as a regulating device of the afore-said kind.

What I claim is:

1. An apparatus for indicating the level of a liquid in a vessel under pressure, which comprises a float suspended within said vessel, said float having a height extending from a point just above the bottom of the vessel to the highest possible level of said liquid, a pressure-tight bellows membrane, a double-armed lever pivotally supported within said bellows membrane, one arm of said lever supporting the float and the other arm being provided with a counter-balance, a pressure chamber, a diaphragm within said pressure chamber and defining one wall thereof, means connected to said one arm of the double-armed lever and adapted to transmit the movement of the float to the diaphragm, means controlled by the movement of said diaphragm for placing said pressure chamber under a pressure equal and opposite to that created by the movement of said diaphragm, and means for indicating the pressure within the pressure chamber.

2. An apparatus as defined in claim 1, wherein the means for transmitting the movement of the float to the diaphragm is connected to the counter-balance supporting arm of the double-armed lever at the point where said arm emerges from the bellows membrane in a pressure-tight manner.

MARTIN RÖVER.